April 4, 1961 E. T. YOUNG 2,977,970
METERING MEANS
Filed Nov. 25, 1955 8 Sheets-Sheet 1

INVENTOR.
EINAR T. YOUNG
BY
ATTORNEYS

April 4, 1961 E. T. YOUNG 2,977,970
METERING MEANS

Filed Nov. 25, 1955 8 Sheets-Sheet 3

INVENTOR.
EINAR T. YOUNG
BY
ATTORNEYS

April 4, 1961 E. T. YOUNG 2,977,970
METERING MEANS

Filed Nov. 25, 1955 8 Sheets-Sheet 4

INVENTOR.
EINAR T. YOUNG
BY
ATTORNEYS

INVENTOR.
EINAR T. YOUNG

April 4, 1961 E. T. YOUNG 2,977,970
METERING MEANS
Filed Nov. 25, 1955 8 Sheets-Sheet 6
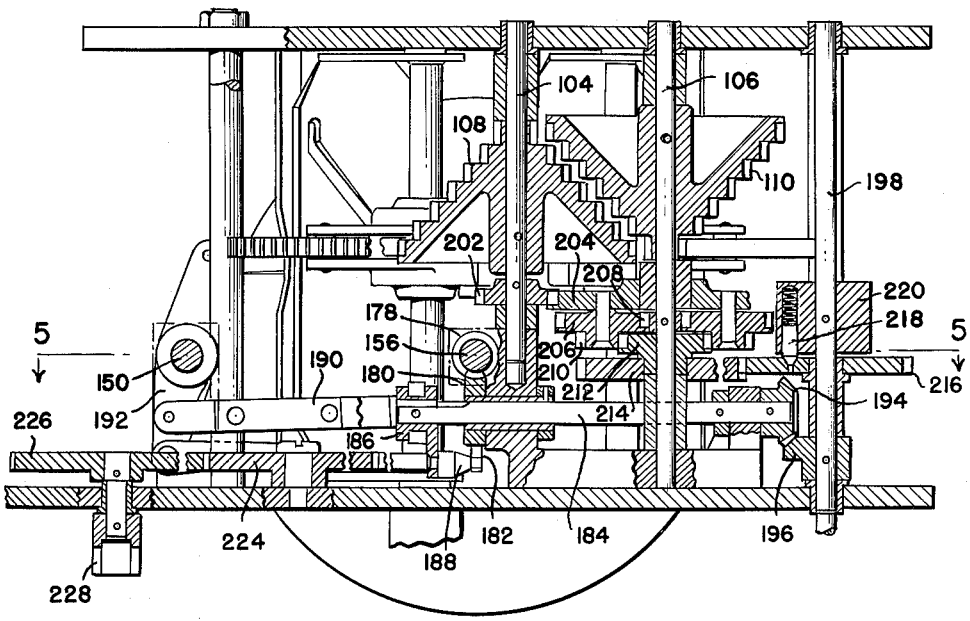
FIG. 6.
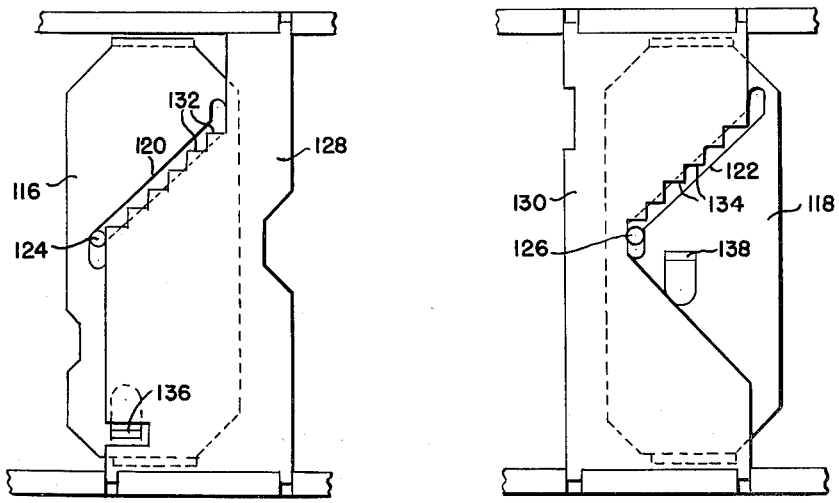
FIG. 9.
FIG. 10
INVENTOR.
EINAR T. YOUNG
BY
ATTORNEYS April 4, 1961 E. T. YOUNG 2,977,970
METERING MEANS Filed Nov. 25, 1955 8 Sheets-Sheet 7

INVENTOR.
EINAR T. YOUNG
BY
ATTORNEYS

April 4, 1961  E. T. YOUNG  2,977,970
METERING MEANS
Filed Nov. 25, 1955  8 Sheets-Sheet 8

INVENTOR.
EINAR T. YOUNG
BY
ATTORNEYS

United States Patent Office 2,977,970
Patented Apr. 4, 1961

2,977,970
METERING MEANS

Einar T. Young, Newtown Square, Pa., assignor to Sun Oil Company, Philadelphia, Pa., a corporation of New Jersey Filed Nov. 25, 1955, Ser. No. 548,907
4 Claims. (Cl. 137—100)

This invention relates to metering means particularly adapted for the metering of base and additive components of a motor fuel.

At the present time, automotive fuels are quite generally sold by oil companies in various grades characterized by different octane ratings and differing in composition particularly in the proportions therein of materials such as tetraethyl lead imparting to them anti-knock properties. The fuels of higher octane ratings sold by a particular company carry higher prices than those sold by the same company but of lower octane rating. Usually, a single company will sell only two grades, commonly designated "regular" and "high test" gasolines.

The present trend in automotive engineering is to supply engines with higher and higher compression ratios, the higher the compression ratio, the higher the octane rating of the fuel which should be used consistent with avoidance of "knock" when the engine is operating under conditions of high power output.

As newer cars replace older ones in general use, the gasolines which are sold have been required to have higher and higher octane ratings, the octane ratings of the "regular" gasolines being increased while the octane ratings of the "high test" gasolines have been correspondingly increased. Few cars, however, require for operation under normal conditions of use the high octane ratings of the "high test" gasolines, but a substantial number of cars require, for completely knockless operation, gasolines having an octane rating somewhat exceeding that of the usually sold "regular" gasolines. The majority of cars, however, particularly older ones in use, do not require even the octane rating of the "regular" gasolines. The purchaser of gasoline has usually, at a particular gas station, only two choices of the gasoline which he may purchase, and for what he considers satisfactory operation of his car he may be required to purchase at a premium price the available "high test" gasoline, even though the actual requirements for car operation satisfactory to him would dictate a gasoline of octane rating intermediate between the "regular" and "high test" grades. The oil companies, however, must, in order not to lose business and good will, supply a "high test" gasoline which will operate satisfactorily under the most demanding driving conditions in those cars having the highest engine compression ratios. The resulting situation is unsatisfactory to both the oil companies and their customers. The ideal situation would be that of having available to a particular car owner the particular grade of gasoline which his car and his driving habits would demand consistent with economy. With a particular make of car, one owner may desire a gasoline which will give him completely knockless operation under all driving conditions, and he may demand such operation even though the conditions in which knocking might occur are very infrequent. Another owner of an identical car may have a quite different attitude, accepting knock under the few conditions for which it occurs but desiring for what he considers best economy of operation a less expensive gasoline which in his own views is quite satisfactory for the general conditions under which he drives. Some drivers keep careful check on the driving miles per gallon which they obtain; other drivers do not. In the sale of gasoline, however, the oil companies must satisfy all of these classes of car owners and drivers and must choose the ratings of their gasolines to secure the optimum customer reactions.

Mention has been made of the fact that usually, a particular gas station will sell no more than two grades of gasoline. Under present conditions, these grades are sold from separate pumps drawing their supplies from separate tanks. An attempt to retail more than two grades, in general, involves a prohibitive investment in separate tanks and pumps operating individually at low demand rates.

In the application of Einar T. Young and Alfred H. Marsh, Serial No. 493,362, filed March 10, 1955, now Patent No. 2,931,538, dated April 5, 1960, there is disclosed a gasoline dispensing system for adequately satisfying the requirements of the motoring public. In accordance therewith, a single so-called "pump" is provided for dispensing gasolines of various grades. The metering means therein may supply a large number of different grades of gasoline, while at the same time it is susceptible, if desired, to have its capabilities lessened to provide a relatively few grades depending upon the desires of the patrons of the station in which it is used.

In accordance with said application, the "pump" draws its supplies from two tanks. One of these tanks may contain what will be hereafter referred to as a "base" gasoline which may have a minimum octane rating, and correspondingly low price, the octane rating being the economical minimum for which there may be any demand. The second tank may contain an "additive" which in itself may be a gasoline having an octane rating far exceeding the most extreme demands. This additive, in view of its rating, would command a quite high price. For example, by way of illustration, the base might consist of a gasoline having an octane rating of 90, which alone, could be sold at a minimum competitive price per gallon. The additive, on the other hand, might have a very high octane rating of 130. Such an octane rating far exceeds any present demands, and may be adopted solely to minimize the quantity of additive for which demand would be made in order to avoid frequent refilling of its supply tank.

The purchaser of gasoline may specify the "grade" of gasoline he desires. This might be in terms of some approximate octane rating, or more practically, in terms of some arbitrary grade number which the gasoline vendor could publicize as having a certain range of octane rating or some guaranteeable minimum octane rating. The vendor can then set an adjustable device which will give to the purchaser the grade of gasoline which he demands. The mechanism then operates to supply to the tank of the car a mixture of the base and additive corresponding to the requested grade.

This mixing of base and additive, if a particular percentage mixture was to be delivered, might involve difficulties in guaranteeing that the purchaser would secure precisely the mixture which he requested. The authorities quite properly demand that the purchaser should not pay for what he does not receive. Inherent and unavoidable errors in proportioning might, from this standpoint, demand that the gasoline proportioning and delivering mechanism should always provide at least what the customer demands and pays for. However, the oil companies operate on a low margin of profit, and the factor of safety in satisfying legal requirements in this fashion would seriously affect the profits involved if the mechanism operated in the region of giving more than necessary in value of gasoline.

Accordingly, these difficulties are desirably removed by assuring that the purchaser of gasoline pays for what he obtains even though what he obtains may not be determinable with high precision. Therefore, in accordance with said Young and Marsh application, a particular price per gallon is assigned to the base and a particular price per gallon is assigned to the additive. Both the base and the additive are then separately metered to give precise indications of the amounts thereof respectively supplied and the prices are, in effect, individually computed and added to give the total price of the sale. Actually delivered to the customer will then be a mixture which might have no percisely predeterminable composition of base and additive. Of two customers requesting the same grade of gasoline one may actually receive in a particular sale a greater proportion of additive to base than the other. The price for a given number of gallons of gasoline mixture will be greater for the first customer than the second; but both will receive precisely what they pay for within the limits of legal tolerance. However, the two mixtures thus provided and nominally of the same grade will be tolerably close and will have at least the octane rating nominally assigned to the grade. Actually, as will become apparent, the error in proportioning the base and additive may be quite small, and, from the standpoint of satisfaction of the customer, he could not possibly distinguish between the two slightly different mixtures that might be delivered to him on separate occasion when he requested the same grade. Furthermore, the difference he will be charged on separate occasions for the same quantity of gasoline of the same grade will be held to, at most, one or two cents.

In the foregoing matters of possible deviations from a theoretically precise proportioning, there is taken into account the fact that practical devices such as may be used for delivering gasoline must be relatively inexpensive and rugged, and must operate under varying temperature conditions, etc., so that the apparatus is far from being of laboratory quality capable of precision operation. As will appear hereafter, the mechanism provided in accordance with a preferred form of the invention satisfies practical requirements without involving refinements which would greatly increase its cost and, possibly, decrease its reliability of operation.

The foregoing remarks have been applied to said Young and Marsh application, but equally apply to the present invention. In accordance with said application, it was specifically assumed that the "additive" was to have an octane rating so greatly exceeding any present demands that at no time would there be required a delivery of additive alone without a substantial amount of base. Further considerations have indicated, however, that in general it might be more desirable to provide the additive in the form of a gasoline which might be demanded for most critical conditions, so that at times, it would be desirable to deliver the additive alone. On the other hand, at other times, it may be desirable to deliver the base alone, the base being a gasoline having the minimum requirements. The mechanism disclosed in said Young and Marsh application is capable of delivering base alone, but not additive alone. It will be evident that if each of these alone is to be delivered, the requirements of operation are extremely wide, ranging from a zero ratio of one constituent to the other to an infinite ratio of the first constituent to the second.

One object of the present invention, therefore, is to provide a device of the general type indicated which is capable of supplying a number of ratios of the two constituent fuels including the zero and infinite ratios just mentioned.

A further object of the invention is to provide an initial setting for a particular dispensing or delivery operation which will start the ratio of the two constituents at at least approximately that which is called for and which will be later automatically controlled. As a result, if one customer had asked for a particular grade of fuel and a second customer then asked for a grade of fuel very considerably different from that requested by the first, the second customer will not initially receive a fuel substantially different from that requested, as would be the case in the apparatus disclosed in said Young and Marsh application, wherein the automatic proportioning devices would have some lag in assuming control for the fuel requested by the second customer. From the mechanical standpoint, this is also advantageous, since it lessens the control burden on the proportioning mechanism in its initial attempt to provide the desired proportioning. The result is less demand on the mechanical outputs from the meters. A simplified and very accurate system may thus be provided.

The foregoing and other objects of the present invention particularly relating to details of construction and operation will become apparent from the following description read in conjunction with the accompanying drawings, in which:

Figure 6 is a vertical section taken on the plane indicated at 6—6 in Figure 5;

Figures 9 and 10 are, respectively, developed views showing certain guide arrangements involved in selection;

Figure 1:
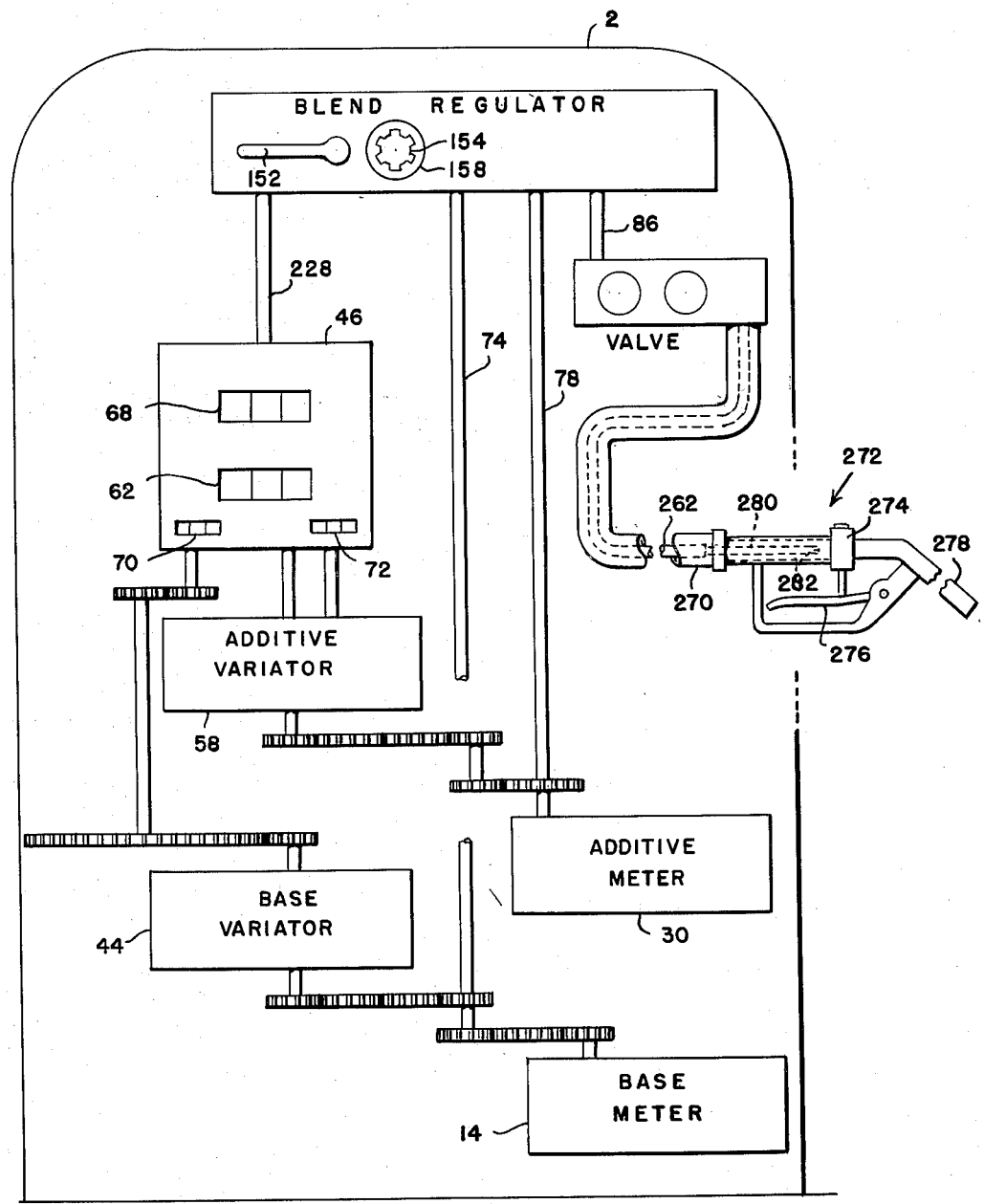
Figure 1 is a diagrammatic view showing an assembly of various elements within a gasoline dispensing "pump" and also showing a desirable delivery hose and control valve arrangement.

For consistency of description, the term "base" will be used in the sense indicated above, i.e., to denote a gasoline of minimum grade or quality. The term "additive" will be used in the sense of a high grade additive which in itself may be a fuel called for by certain customers. However, it will be evident that the additive may be of the type particularly referred to in said Young and Marsh application, i.e., a fuel having "grade" far exceeding what may be called for. But as indicated above, the present invention is particularly concerned with the securing of the possibility of delivering 100% of an additive. The invention is therefore particularly directed to the delivery of additive as a directly usable fuel, though it will be evident that the invention is not limited to this but the mechanism hereafter described may also be used for the delivery of mixtures wherein the additive may be of a quality never called for alone.

There is indicated at 2 the upper portion of the usual casing of a gasoline "pump," such a casing, in general, involving a base portion in which there is located a gasoline pump and its driving motor together with a gasoline meter. In the upper portion of such a casing there is provided computing mechanism comprising a so-called variator and counters. Heretofore, the variator received an input from the gasoline meter and involved adjustable mechanism for setting a price per gallon exhibited through a window or windows in the "pump." The input from the meter passed through the variator to operate a counter indicating the number of gallons of gasoline delivered. A second output from the variator operated a second counter indicating the total price as computed from the meter input and the price per gallon setting. Both the total gallons and total price were exhibited through windows in the housing. Such meters also contained counters to indicate the total amount of sales through the pump and were provided with mechanisms for resetting to zero the exhibited indications of total gallons and total price of a sale. Reference is made to these conventional mechanisms since in accordance with the invention variators of conventional type are used and the counting arrangements are, in general, conventional with mechanical modifications as will be described.

Passing to the matters of the present invention, the "pump" may have substantially conventional external appearance, and has located in its base a base pump 4 driven by a motor in conventional fashion and arranged to receive through pipe 6 from a supply tank the base gasoline referred to above. In the usual fashion, the base pump 4 is provided with a bypass 8 in which is located a loaded relief valve 10 so that if the delivery hose outlet is shut off the base pump may continue to operate, recirculating the base gasoline through the valve 10 from its outlet to its inlet. Delivery of gasoline from the base pump takes place through a pipe 12 which delivers the gasoline through the base meter 14 which meter may be of conventional type. Such meters record accurately the gasoline delivered therethrough to the precision required by the authorities. From the meter 14 the base is delivered through a pipe 18 containing a check valve 16.

A pump 22 for the additive draws its supply of additive from a tank through pipe connection 20. This pump 22 may be of the same type as the base pump 4 and has provided in association with it a bypass 24 incorporating a relief valve 26.

The additive pump 22 delivers additive through line 28 to the meter 30 which may be of the type serving to meter the base. Delivery from the meter 30 takes place through piping 32 which includes the check valve 34.

The base and additive delivered, respectively, through lines 18 and 32, are respectively controlled by the valves 36 and 38 from which they are delivered through conduits 37 and 39 which will be described in greater detail hereafter.

Figure 2:
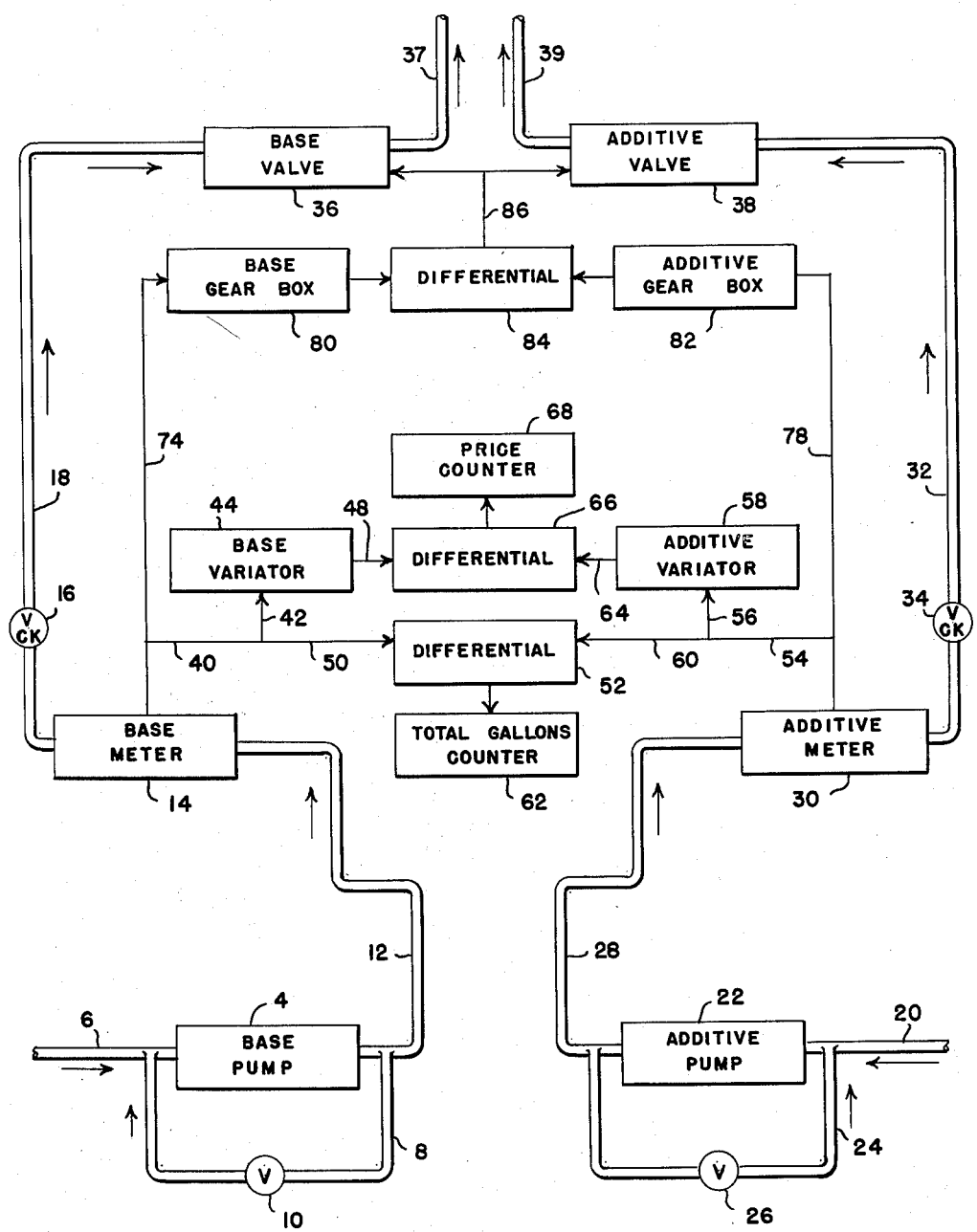
Figure 2 is a block diagram illustrating the liquid and mechanical connections of various elements involved in a preferred form of mechanism.
Figure 3:
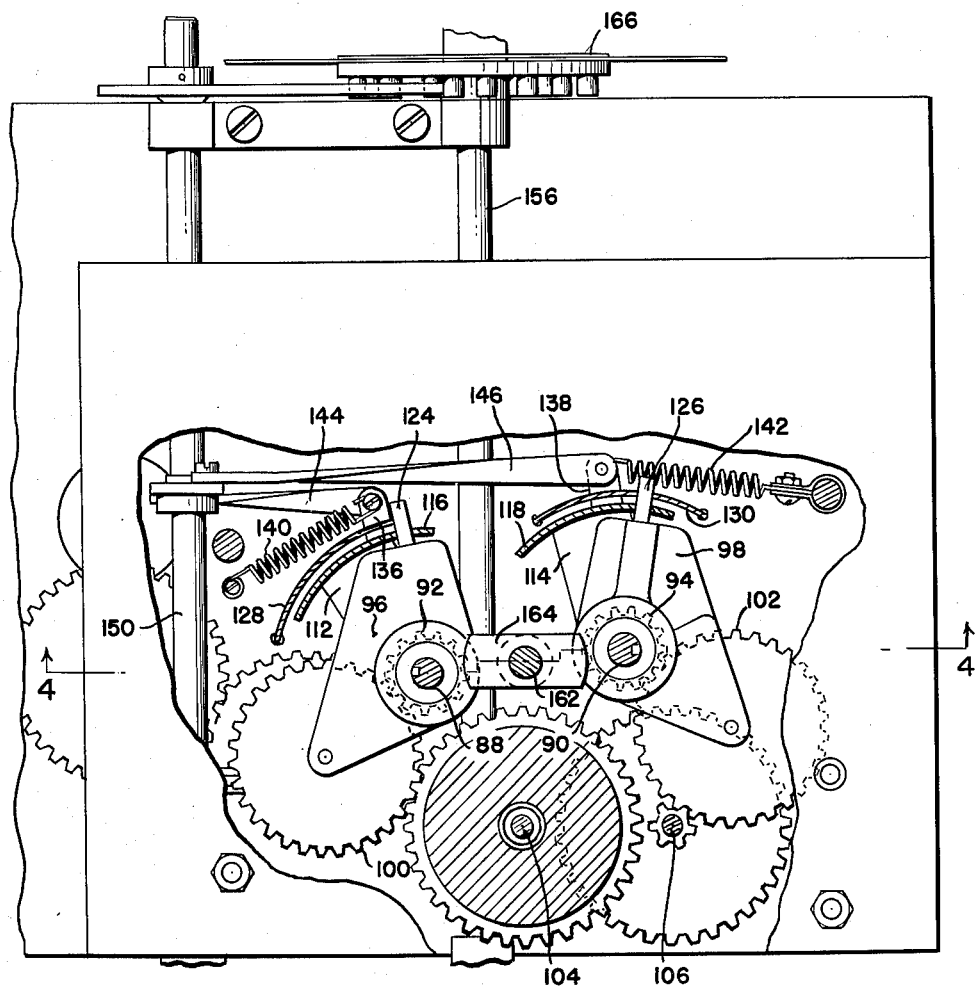
Figure 3 is a plan view, partially in section on a plane indicated at 3—3 in Figure 4, showing the blend regulator details.

The solid connecting lines provided with arrows in Figure 2 indicate mechanical connections and these connections are more fully indicated structurally in Figure 1, some of the connections, however, being internal ones within elements hereafter described. The base meter 14 is connected to the base variator 44 through mechanical connections indicated at 40 and 42. These connections are conventional, the variator containing the usual settable means for introducing a price and providing an output at 48 to a totalizer indicated generally at 46 in Figure 1 but containing various elements which are separately indicated by boxes in Figure 2. The base meter provides an input at 50 to the differential 52.

The additive meter 30 provides an output at 54 which, by way of a connection 56, feeds an additive variator 58 in which the price per gallon of the additive is inserted to give an output at 64 corresponding to the total price of the additive. A connection at 60 provides to the differential 52 the output of the additive meter 30. The variators 44 and 58 may be of conventional form and need not be described in detail.

The inputs from the base meter and additive meter corresponding to the quantities of base and additive, respectively, are fed into a differential 52 which sums the two quantities and provides an output to the total quantity counter 62.

The differential 66 receives the outputs from the base variator 44 and additive variator 58, these outputs representing the prices of the base and additive which are delivered. These prices are added by the differential and fed to the price counter 68. The total gallons delivered and the price are exhibited through windows in the gasoline "pump" as are also the base price per gallon (at 70) and the additive price per gallon (at 72). Both of these indications, will, of course, be associated with suitable descriptive legends on the face of the "pump."

The foregoing indications are all that are required for exhibition to the customer who will be interested in the base price, the additive price, the total gallons, and the total price. Where particular qualities of gasoline are offered, there may also be an indication of the grade, though this, in general, is unnecessary. From the description of the mechanism involved in setting the grade, it will be apparent that the indication may be presented in any one of many arbitrary fashions.

What has been so far indicated in general fashion is all that is involved in indicating to the customer the amount of gasoline he has received and its total price. As will be evident from what has been described, he secures the total of the quantity measured by the base and additive meters, and he will pay the price which is the sum of the prices of the base and additive which he actually receives. The mechanism running from the inputs 40 and 54 to the counters 62 and 68 may be the same as described in said Young and Marsh application and need not be redescribed herein, reference being made to said Young and Marsh application for details. What will now be described is the operation involved in securing, at least to a practically close approximation, a proportioning of the base and additive in a predetermined ratio.

The base meter and additive meter, respectively, provide inputs through mechanical connections 74 and 78 to corresponding gear boxes 80 and 82 which, in turn, provide inputs to a differential 84 which through mechanical connections indicated at 86 controls the base and additive valves 36 and 38. The devices just mentioned will now be described in detail.

The connections 74 and 78 drive, respectively, shafts 88 and 90 on which are splined pinions 92 and 94. These pinions are enclosed in carriers 96 and 98 which are journalled on the shafts 88 and 90 and arranged to slide lengthwise thereof. The carriers 96 and 98 mount gears 100 and 102 which respectively mesh with the pinions 92 and 94. A pair of shafts 104 and 106 have secured thereto cone-gears 108 and 110 with which the gears 100 and 102 are adapted to mesh selectively. As indicated in Figure 6, the cone-gears are oppositely arranged. Also journalled on the shafts 88 and 90 are stirrup members 112 and 114 provided with respective arcuate plates 116 and 118 provided with helically arranged slots 120 and 122 which receive pins 124 and 126 projecting from the carriers 96 and 98. Fixed plates 128 and 130 are provided with steps 132 and 134 which are arranged to locate the pins 124 and 126 in their various positions of adjustment in proper alignment with corresponding gear elements in the cone-gears. Arms 136 and 138 projecting from the stirrup members 112 and 114 are arranged to be acted upon by tension springs 140 and 142 urging both of the stirrups in an outward direction, and, as will be obvious, the gears 100 and 102 toward meshing positions. Links 144 and 146 are respectively connected to the arms 136 and 138, joining them to the arms of a lever 148 which is secured to a shaft 150. The shaft 150 projects forwardly through the "pump" casing and carries a handle 152 which may be rocked downwardly to disengage the gears 100 and 102 from mesh.

A shaft 156 also projects forwardly through the "pump" casing and carries a knob 154 to which is secured a dial 158 indicating the quality of the fuel to be delivered. The shaft 156 has secured thereto a pinion 160 which meshes with a rack 162 on which is secured a flanged member 164 embracing the carriers 96 and 98 to cause them to move lengthwise of the shafts 88 and 90 when the rack is driven by rotation of knob 154.

Figure 7:
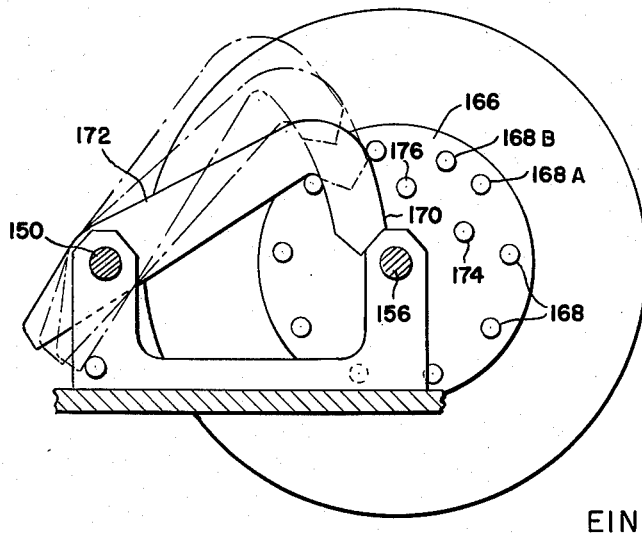
Figure 7 is a vertical section taken on the plane indicated at 7—7 in Figure 5.
Figure 5:
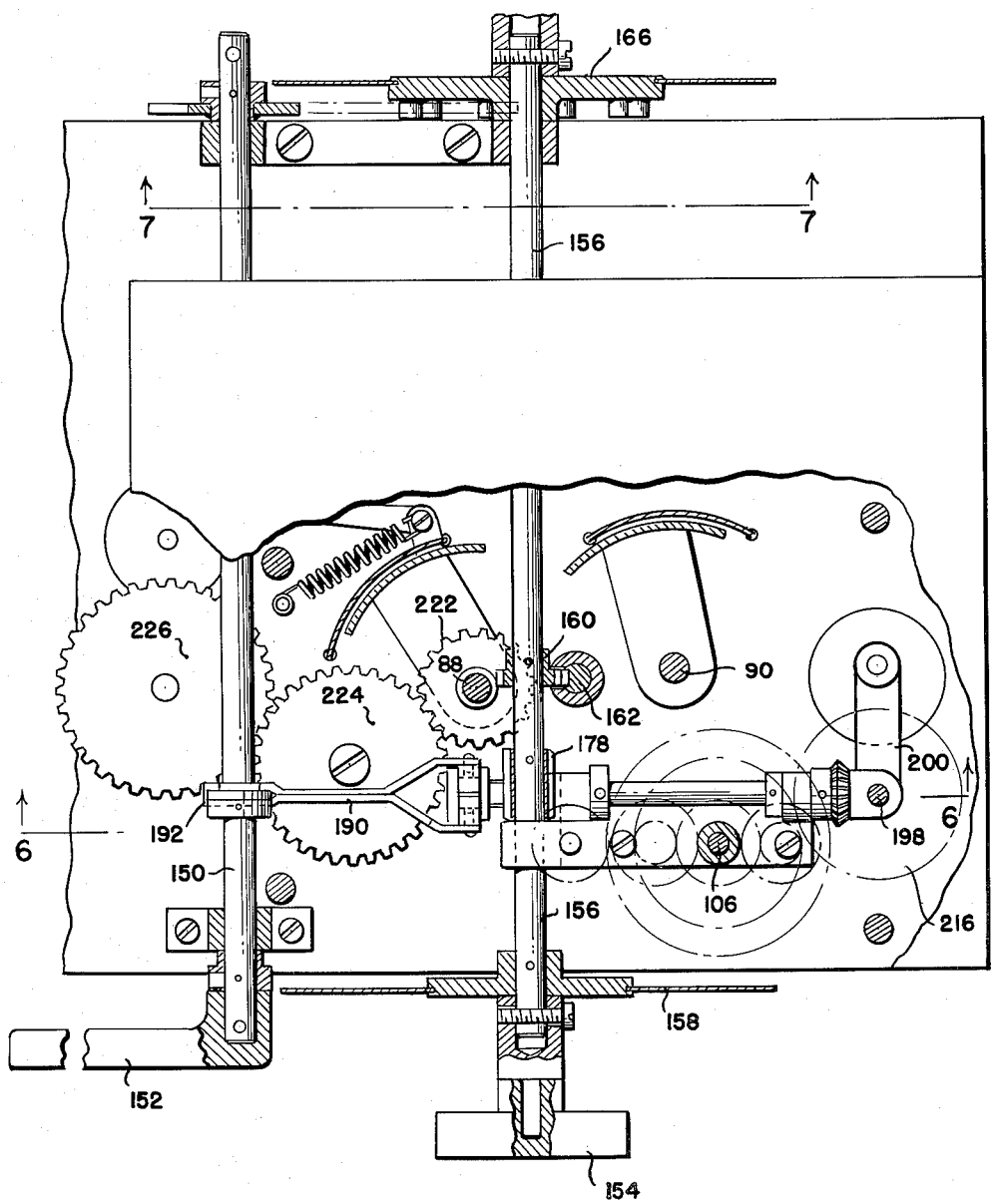
Figure 5 is another plan view, similar to Figure 3, but showing various elements in section on the plane indicated at 5—5 in Figure 6.
Figure 11:
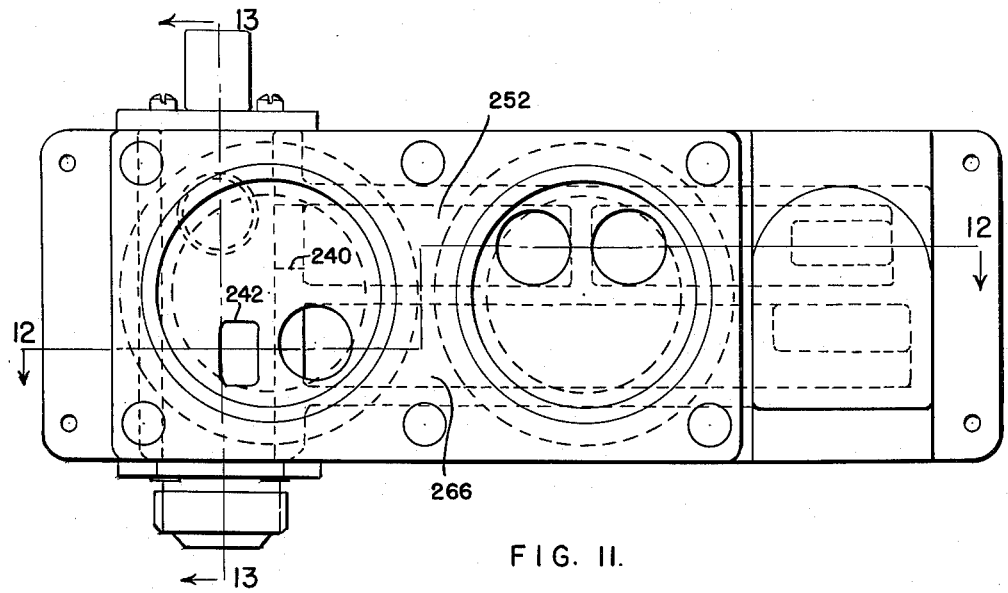
Figure 11 is an elevation showing a control valve assembly.
Figure 12:
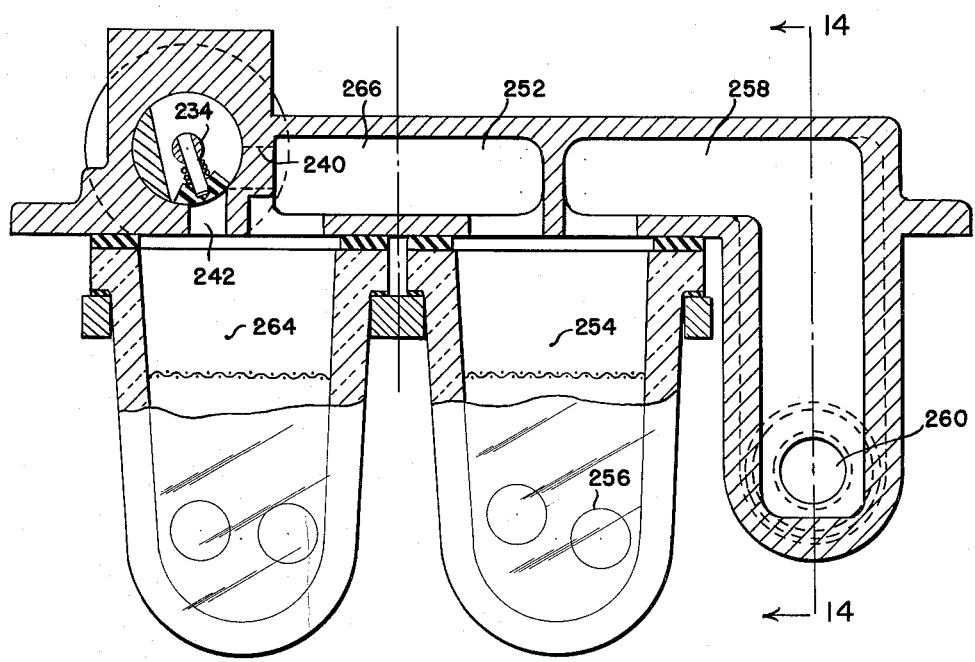
Figure 12 is a horizontal section taken on the broken surface the trace of which is indicated at 12—12 in Figure 11.
Figure 13:
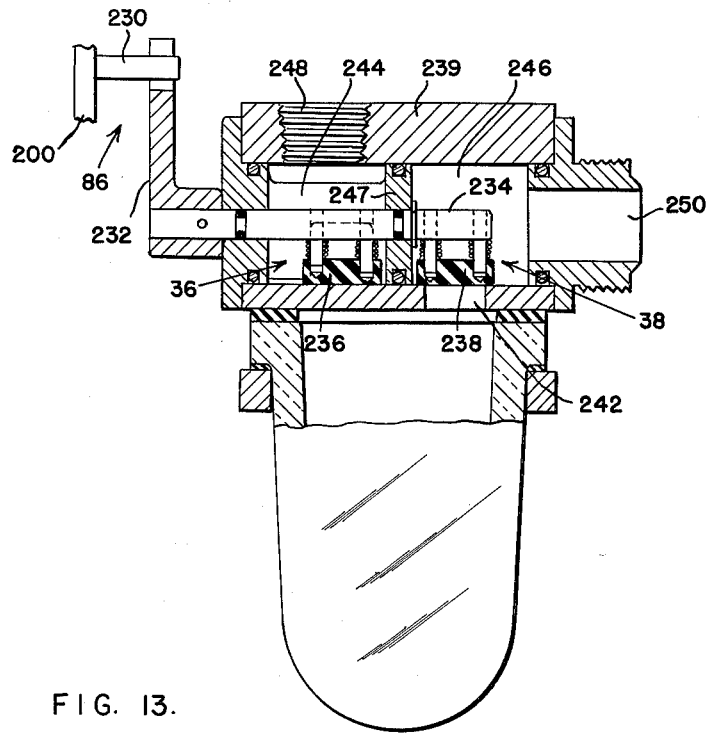
Figure 13 is a vertical section taken on the plane indicated at 13—13 in Figure 11.
Figure 14:
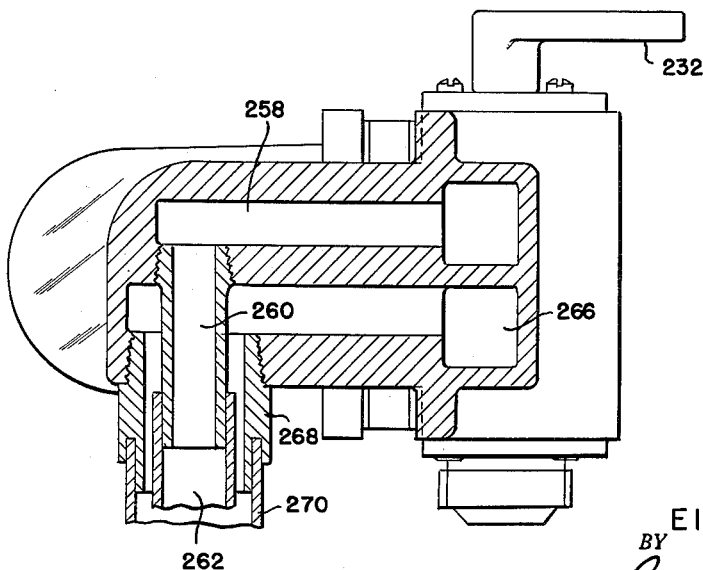
Figure 14 is a vertical section taken on the plane indicated at 14—14 in Figure 12.

At the rear end of shaft 156 there is secured a disc 166 carrying a series of pins 168 of which the end pins are particularly designated as 168A and 168B. The nose portion 170 of a lever 172 is arranged to pass between pairs of these pins and is provided with a pointed end having a cam action on the pins to enforce alignment of the shaft 156 in particular positions when engagement is produced. The arm 172 is secured to the shaft 150. Pins 174 and 176 are provided as shown in Figure 7 to prevent full inward movement of the nose 170 of lever 172 when the nose projects between the end pins and the next adjacent pins 168 in the series.

Figure 8:
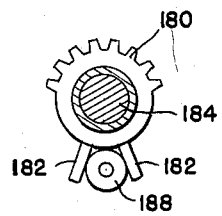
Figure 8 is a sectional detail of a clutch arrangement.
Figure 4:
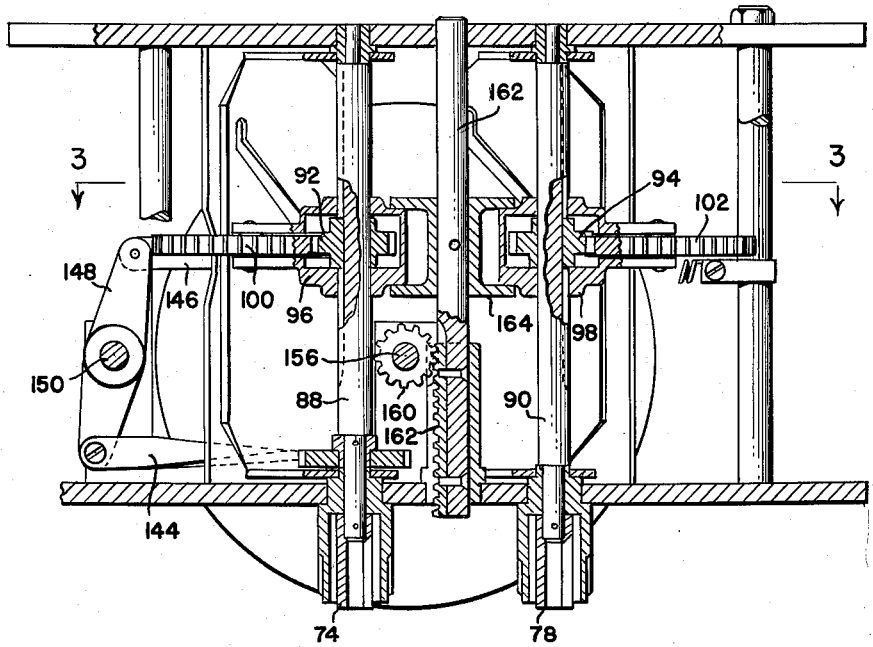
Figure 4 is a vertical section taken on the plane indicated at 4—4 in Figure 3.

The shaft 156 is provided with a helical gear 178 which meshes with a wheel segment 180 (Figure 8) which is provided with a pair of pins 182 extending radially therefrom. The segment 180 is journalled on a shaft 184 to which is splined a member 186 carrying a cone-shaped pin 188 arranged to engage between the pins 182. The member 186 is circumferentially grooved for engagement by segmental members carried by the forked end of a link 190 which is pivoted to an arm 192 carried by the shaft 150. A clutch arrangement is thus provided, the shaft 184 being clutched to the wheel segment 180 when the pin 188 is engaged between the pins 182. Normally, when the handle 152 is in its raised position, the shaft 150 is in an extreme clockwise position as viewed from the front of the apparatus and the clutch arrangement just described is disengaged.

A bevel pinion 194 is secured to the right hand end of shaft 184 and meshes with the bevel teeth of a member 196 secured to a shaft 198 and provided with an arm 200 which provides a part of the valve driving connection referred to heretofore as 86.

A pinion 202 secured to the shaft 104 meshes with a gear 204 which is journalled about the axis of the shaft 106 and is provided with pins mounting the planet pinions 206 which mesh with a sun pinion 208 secured to the shaft 106. The pinions 206 are integrally formed with smaller pinions 210 which mesh with a central pinion 212 to which is secured a gear 214 meshing with the gear 216 journalled on the shaft 198. A spring urged pin 218 is carried by a member 220 secured to the shaft 198 and by engagement in a shallow opening in the gear 216 provides a yielding drive connection between the gear 216 and the shaft 198. Under normal conditions of operation the gear 216 may be considered to be secured to the shaft 198, but the detent arrangement is arranged to yield in case of jamming to prevent damage by breaking the connection between the gear and shaft.

A train of gears 222, 224 and 226 connect the shaft 88 with an output connection 228 leading to the counter as indicated in Figure 1. This is merely a matter of convenience in providing a connection from the base meter 14 to the counter.

A pin 230 projects downwardly from the arm 200 and engages within a slot of an arm 232 secured to a shaft 234 which serves to mount the spring-engaged valve members 236 and 238 which are provided with cylindrical surfaces engaging the interior wall of a bore in the valve housing 239. Ports 240 and 242 cooperate with the valves 236 and 238, respectively, for the control of flow of the fuel constituents. The base constituent enters the chamber 244 in the valve housing through the connection 248, and the additive constituent enters the chamber 246 through the connection 250, the two chambers being separated by a partition 247. The port 240 communicates with a passage 252 from which flow takes place into the interior of a sight glass 254 in which there may be located plastic balls 256 to indicate active flow. From the sight glass 254 flow then takes place through passage 258 to the tube 260 which is connected to the interior tube 262 of a delivery hose. The port 242 communicates directly with the sight glass 264, which also contains plastic balls, and from which the flow takes place through passage 266 and the connection 268 into the outer tube 270 of the delivery hose. As shown particularly in Figure 1, the delivery hose has the construction therein shown in which the nozzle 272 is controlled by a valve 274 operable by a lever 276 to control flow to the outlet 278. The inner tube 262 is connected to a tube 280 which terminates at 282 closely adjacent to the valve 274. As will be evident, the two constituents flowing respectively through the central and outer tubes 262 and 270 do not become admixed until they reach the position 282. Since this is closely adjacent to the valve 274, the hose does not contain any appreciable quantity of admixed constituents so that in a delivery operation the delivery will start essentially with the desired proportioning of the constituents.

The operation will now be described.

The principle of operation of the described apparatus will become evident if it is considered that, a mixture of the constituents being delivered, the gears 100 and 102 are meshed with corresponding gear elements of the cone-gears 108 and 110. The inputs from the meters occurring at 74 and 78 will effect drives of the shafts 104 and 106 in accordance with the chosen setting and the differential gearing 204—212 provides an output which is equal to the difference in rotations of the shafts 104 and 106. Assuming that the flows through the meters are such that this output is zero, this means that the flows through the two meters are in a ratio corresponding to the setting of the gears. If the flows are not in this ratio, then an output is provided from the differential gearing which will effect a resetting of the valves 236 and 238 in a direction to increase the flow of one constituent and decrease that of the other to provide the desired ratio. Equilibrium would then be attained when the flows are in the ratio determined by the gear settings. In general, there will be some hunting about the precise equilibrium position. But it will be noted that, assuming no slippage in the meters, the quantities delivered are essentially integrated, and over an extended delivery time the error in proportioning will be only that which is involved in the readjustment from some previous setting of the valves to essentially that setting which controls the proper proportioning. Cumulative error does not occur.

It has been mentioned that there may be an error due to the fact that in beginning one delivery operation the valves may have been set for a quite different proportioning than that which is desired. During the time that readjustment of the valve settings occurs there will be a deviation from desired proportioning. In accordance with the present invention there is a minimizing of this error by approximately setting manually the valves to that which is required as follows:

When the mechanism is at rest, the released condition of the handle 152 results in maintenance of the shaft 156 in its set position by reason of the engagement of the nose 170 of lever 172 between a pair of the pins 168. Readjustment of the shaft 156 can only be effected by the rocking of shaft 150 by the handle 152. The rocking of shaft 150 not only releases gears 100 and 102 from mesh and the nose 170 from between the pins 168, but prior to complete release of these pins the counterclockwise rocking of shaft 150 forces the conical pin 188 between the pins 182 to couple the shaft 184 to the member 180. Since it may be assumed that the valves (except for hunting error) are in a position resulting from the previous operation substantially corresponding to the proportioning which had been effected therein, the pin 188 will enter the space between the pins 182 and as it is moved toward the right as viewed in Figure 6 and the shaft 184 may be slightly rocked by the resulting camming action for slight readjustment of the valve positions. The position of the member 180 will approximately correspond to that of the valves for the proper delivery of any set ratio. While the handle 152 is held depressed, the knob 154 is then rotated to the desired ratio for the new delivery operation. As this adjustment is made, not only are the gears 100 and 102 moved axially toward the desired position for mesh with the cone-gears, but the shaft 184 will also be driven to readjust the valves 236 and 238 to positions approximately correct for the new delivery. When the handle 152 is then released, the shaft 156 is again locked, the pin 188 is withdrawn to declutch the shaft 184 from the member 180, and the gears 100 and 102 are permitted to mesh under the action of the springs 140 and 142. Due to what has just been described, the valves 236 and 238 are approximately manually set in the positions required for the new proportioning, and consequently when delivery starts there will be only a relatively minor readjustment of these valves and the delivery will start with approximately correct proportioning. Of course, some slight readjustment will occur, but the initial mixing error is substantially reduced. There is also relief from the meters of the burden of substantially readjusting the valves, and the removal of loading minimizes the meter error.

The foregoing has assumed that both fuel constituents are being delivered. Automatic operation of the gearing and differential occurs only under such conditions. However, when only one of the constituents is to be delivered, the setting is manual, with one or the other of the valves 236 and 238 completely closed and the other wide open. To effect such delivery of a single constituent, the handle 152 is depressed, effecting the actions already noted, and the knob 154 is then turned to a position in which the space between pin 168B and the next adjacent pin 168, or the space between pin 168A and its next adjacent pin 168 is brought into alignment with the nose 170 of lever 172. During the adjustment the pin 188 clutches the shaft 184 to the member 180, so that the adjustment of shaft 156 will move one or the other of valves 236 and 238 to the fully closed position and the other to its fully open position. The release of the handle 152 then permits the nose 170 to enter the aligned space between pins, but the handle 152 and shaft 150 cannot return to normal position because of the interposition of one or the other of pins 174 and 176. The prevention of full return of shaft 150 maintains gears 100 and 102 out of mesh and also prevents the complete withdrawal of pin 188. The delivery operation then effects delivery of only one constituent, the gearing being inoperative, with one or the other of the gears 100 and 102 rotating idly.

It will be noted from the figures that the ports 240 and 242 are substantially rectangular, the valves being in the same radial alignment so that, the ports being angularly displaced, there is closing of one port as the other is opened by the valves. In view of the automatic operation it has been found in practice unnecessary to provide special shaping of the ports, though this may be done if it is desired to secure even more accurate manual positioning of the valves to correspond to the proper proportioning for which setting is made. It may be noted, however, that the valves do not have any necessarily fixed position with respect to their ports for proper proportioning, but that the proportioning is effected through what amounts to a feed back loop through the meters. This is in contrast with proposals heretofore made in this art in which definite valve positions are depended upon for proportioning. In such cases it is essential that the valves and ports should be shaped or otherwise related very carefully and in addition it has been necessary, to secure any reasonable accuracy of proportioning, to provide compensation for different hydrostatic levels of the constituents, for temperature variations, or the like. All such devices are eliminated in accordance with the present invention, where the accuracy of proportioning is dependent solely upon the accuracy of operation of the meters.

Furthermore, to the extent that proportioning may be inaccurate, as may be the case to a slight extent particularly if only a small quantity of fuel is delivered in an operation due to the resetting of the valves which may be required (though minimized as described above), the arrangement is such that the customer pays only for what he receives. He may receive a slightly different proportion of the constituents than was called for, but for any practical purposes the error is negligible and could not possibly be detected in the operation of the engine using the fuel mixture. It may be noted that in event of an accident such as sticking of the valves, damage to the gearing is avoided due to the fact that the pin 218 may yield to open the driving connection between the gearing and shaft 198. If the shaft 184 and the valves are not initially manually adjusted to approximate position for the proper proportioning, it might also happen that jamming could occur in the readjusting operation, causing the valves to move to some extreme position. However, the approximate manual setting insures that only slight readjustments of the valves are required.

What is claimed is:

1. Apparatus for the simultaneous delivery of two liquids comprising individual means metering the deliveries of said liquids, valves individually controlling the deliveries of said liquids, adjustable means operated by said metering means and simultaneously controlling said valves to effect the delivery of said liquids in substantially a predetermined ratio, and a single manually controlled means for adjusting the last mentioned adjustable means and for simultaneously presetting said valves in approximate positions for delivery of said liquids in said predetermined ratio.

2. Apparatus for the simultaneous delivery of two liquids comprising individual means metering the deliveries of said liquids, valves individually controlling the deliveries of said liquids, adjustable means including differential gearing operated by said metering means and simultaneously controlling said valves to effect the delivery of said liquids in substantially a predetermined ratio, and a single manually controlled means for adjusting the last mentioned adjustable means and for simultaneously presetting said valves in approximate positions for delivery of said liquids in said predetermined ratio.

3. Apparatus for the simultaneous delivery of two liquids comprising individual means metering the deliveries of said liquids, valve means controlling the flow of at least one of said liquids, means receiving inputs from both of said metering means for approximately controlling the ratio of quantities of said liquids simultaneously delivered, and a single manually controlled means for adjusting the last mentioned input-receiving means for adjustment of said ratio and for simultaneously presetting said valve means approximately for delivery of said liquids in said ratio.

4. Apparatus for the simultaneous delivery of two liquids comprising individual means metering the deliveries of said liquids, valve means controlling the flow of both of said liquids, means receiving inputs from both of said metering means for approximately controlling the ratio of quantities of said liquids simultaneously delivered, and a single manually controlled means for adjusting the last mentioned input-receiving means for adjustment of said ratio and for simultaneously presetting said valve means approximately for delivery of said liquids in said ratio.

References Cited in the file of this patent

UNITED STATES PATENTS

| | | |
|---|---|---|
| 1,767,588 | Hutton | June 24, 1930 |
| 1,926,333 | Fulcher | Sept. 12, 1933 |
| 2,195,005 | Grosvenor et al. | Mar. 26, 1940 |
| 2,624,360 | Goddard | Jan. 6, 1953 |
| 2,641,271 | Pressler | June 9, 1953 |
| 2,795,235 | Hoyt | June 11, 1957 |
| 2,799,288 | Knight | July 16, 1957 |